(12) United States Patent
Tremelling

(10) Patent No.: US 9,088,190 B2
(45) Date of Patent: Jul. 21, 2015

(54) ELECTRICAL MACHINES AND ELECTRICAL MACHINE ROTORS

(75) Inventor: Darren D. Tremelling, Cary, NC (US)

(73) Assignee: ABB Research Ltd., Zurich (CH)

(*) Notice: Subject to any disclaimer, the term of this patent is extended or adjusted under 35 U.S.C. 154(b) by 93 days.

(21) Appl. No.: 13/613,674

(22) Filed: Sep. 13, 2012

(65) Prior Publication Data

US 2013/0241337 A1    Sep. 19, 2013

Related U.S. Application Data

(60) Provisional application No. 61/565,066, filed on Nov. 30, 2011.

(51) Int. Cl.
*H02K 1/28* (2006.01)
*H02K 1/22* (2006.01)
*H02K 1/27* (2006.01)
*H02K 7/00* (2006.01)
*F16C 3/02* (2006.01)

(52) U.S. Cl.
CPC .. *H02K 1/28* (2013.01); *H02K 1/22* (2013.01); *H02K 1/2766* (2013.01); *F16C 3/026* (2013.01); *H02K 7/003* (2013.01)

(58) Field of Classification Search
None
See application file for complete search history.

(56) References Cited

U.S. PATENT DOCUMENTS

| | | | |
|---|---|---|---|
| 3,434,709 A | 3/1969 | Ramsay | |
| 3,567,974 A * | 3/1971 | Spingler | 310/46 |
| 3,745,389 A | 7/1973 | Lorch | |
| 4,028,573 A | 6/1977 | Terrone | |
| 4,186,320 A * | 1/1980 | Hillman | 310/93 |
| 4,327,302 A * | 4/1982 | Hershberger | 310/156.56 |
| 4,480,207 A * | 10/1984 | Miller et al. | 310/156.52 |
| 4,534,116 A | 8/1985 | Davis | |
| 4,667,123 A | 5/1987 | Denk | |
| 4,700,097 A * | 10/1987 | Kawada et al. | 310/162 |
| 4,724,348 A | 2/1988 | Stokes | |
| 4,767,125 A | 8/1988 | Barry | |
| 4,792,712 A | 12/1988 | Stokes | |

(Continued)

FOREIGN PATENT DOCUMENTS

| | | |
|---|---|---|
| CA | 2684295 | 10/2008 |
| CN | 201138764 Y | 10/2008 |

(Continued)

OTHER PUBLICATIONS

U. Fromm, International Searching Authority—European Patent Office, International Search Report and Written Opinion for corresponding International Application No. PCT/US2012/054183, European Patent Office, mailed Feb. 17, 2014.

(Continued)

*Primary Examiner* — Tran Nguyen
(74) *Attorney, Agent, or Firm* — Steven W. Hudnut

(57) ABSTRACT

Electrical machine rotors and electrical machines are disclosed. The electrical machine rotors may include a shaft, a pair of permanent magnets arranged to form a magnetic pole on the rotor, a pole iron, and a pair of opposed inter-pole irons. The pole iron may retain the pair of magnets against the inter-pole irons and relative to the shaft. The electrical machine rotors may be assembled into electrical machines that include the rotor and a stator that includes a stator iron and at least one coil. In some examples, the shaft may be hollow, nonmagnetic, fiber-reinforced, and/or fabricated at least partially from a composite material.

17 Claims, 2 Drawing Sheets

(56) References Cited

U.S. PATENT DOCUMENTS

| | | | |
|---|---|---|---|
| 4,930,201 A | 6/1990 | Brown | |
| 5,091,668 A | 2/1992 | Cuenot | |
| 5,111,094 A | 5/1992 | Patel | |
| 5,233,248 A * | 8/1993 | Kawamura et al. | 310/88 |
| 5,285,699 A | 2/1994 | Walls | |
| 5,379,964 A * | 1/1995 | Pretto et al. | 242/571.2 |
| 5,518,108 A * | 5/1996 | Spurlin | 198/769 |
| 5,554,900 A | 9/1996 | Pop | |
| 5,928,736 A | 7/1999 | Parekh | |
| 6,047,461 A | 4/2000 | Miura | |
| 6,072,252 A | 6/2000 | Van Dine | |
| 6,344,702 B1 * | 2/2002 | Rodriguez et al. | 310/429 |
| 6,452,301 B1 * | 9/2002 | Van Dine et al. | 310/156.12 |
| 6,700,288 B2 | 3/2004 | Smith | |
| 6,703,741 B1 | 3/2004 | Ifrim | |
| 6,750,584 B2 | 6/2004 | Smith | |
| 6,768,238 B2 * | 7/2004 | Knauff et al. | 310/156.56 |
| 6,796,739 B1 | 9/2004 | Shoykhet | |
| 6,879,075 B2 * | 4/2005 | Calfo et al. | 310/156.01 |
| 6,891,299 B2 | 5/2005 | Coupart | |
| 6,967,420 B2 | 11/2005 | Laurent | |
| 6,969,937 B1 | 11/2005 | Schuering | |
| 7,205,695 B2 | 4/2007 | Smith | |
| 7,355,309 B2 | 4/2008 | Costin | |
| 7,358,637 B2 | 4/2008 | Tapper | |
| 7,545,067 B2 | 6/2009 | Drexlmaier | |
| 7,573,168 B2 | 8/2009 | Carl, Jr. | |
| 7,617,582 B2 | 11/2009 | Down | |
| 7,619,342 B2 * | 11/2009 | Malmberg | 310/156.48 |
| 7,692,348 B2 | 4/2010 | Gruenhagen | |
| 7,768,169 B2 * | 8/2010 | Clark | 310/156.31 |
| 2003/0034707 A1 | 2/2003 | Smith | |
| 2005/0099079 A1 | 5/2005 | McMullen | |
| 2006/0061227 A1 | 3/2006 | Heideman | |
| 2006/0202581 A1 | 9/2006 | Kimura | |
| 2006/0255679 A1 * | 11/2006 | Dine et al. | 310/156.55 |
| 2007/0024141 A1 | 2/2007 | Drexlmaier | |
| 2007/0290564 A1 | 12/2007 | Clark | |
| 2008/0088193 A1 | 4/2008 | Tervaskanto | |
| 2008/0093945 A1 | 4/2008 | Gruenhagen | |
| 2008/0150385 A1 | 6/2008 | Silander | |
| 2008/0238234 A1 | 10/2008 | Saban | |
| 2009/0021094 A1 | 1/2009 | Takimoto | |
| 2009/0033167 A1 | 2/2009 | Bradfield | |
| 2009/0146520 A1 | 6/2009 | Kanninen | |
| 2009/0146521 A1 | 6/2009 | Maki-Ontto | |
| 2009/0160284 A1 | 6/2009 | Kimura | |
| 2009/0251014 A1 | 10/2009 | Goodzeit | |
| 2010/0019600 A1 | 1/2010 | Saban | |
| 2010/0117476 A1 | 5/2010 | Clark | |
| 2011/0140561 A1 * | 6/2011 | Clark et al. | 310/156.12 |
| 2011/0198956 A1 * | 8/2011 | Bailey et al. | 310/91 |
| 2013/0062984 A1 | 3/2013 | Tremelling | |

FOREIGN PATENT DOCUMENTS

| | | | |
|---|---|---|---|
| CN | 201163733 Y | 12/2008 | |
| CN | 101359847 A | 2/2009 | |
| CN | 201219227 Y | 4/2009 | |
| DE | 102005042543 A | 3/2007 | |
| DE | 102005047771 A1 | 4/2007 | |
| DE | 102007006986 B3 | 6/2008 | |
| DE | 102009026288 A1 | 2/2011 | |
| EP | 955714 | 10/1999 | |
| EP | 1796248 | 6/2007 | |
| EP | 2091131 | 8/2009 | |
| EP | 0803962 A1 | 10/2009 | |
| EP | 2182613 | 5/2010 | |
| FR | 2802726 A1 | 6/2001 | |
| FR | 2932618 | 6/2008 | |
| FR | 2922693 A1 | 4/2009 | |
| GB | 2299217 | 9/1996 | |
| JP | 59072968 A * | 4/1984 | H02K 21/08 |
| JP | 61073559 | 4/1986 | |
| JP | 61207162 | 9/1986 | |
| JP | 3273841 | 12/1991 | |
| JP | 4165934 | 6/1992 | |
| JP | 7046780 | 2/1995 | |
| JP | 8265997 | 10/1996 | |
| JP | 10023694 | 1/1998 | |
| JP | 10210690 | 8/1998 | |
| JP | 10285847 A | 10/1998 | |
| JP | 2001078378 | 3/2001 | |
| JP | 2001086677 | 3/2001 | |
| JP | 2004282889 A | 10/2004 | |
| JP | 2000134839 | 7/2005 | |
| JP | 2006158008 | 6/2006 | |
| JP | 10225032 | 9/2008 | |
| JP | 2008219965 | 9/2008 | |
| KR | 20000029130 A | 5/2000 | |
| WO | 0165663 | 9/2001 | |
| WO | 2004019467 | 3/2004 | |
| WO | 2005117235 | 12/2005 | |
| WO | 2006003244 | 1/2006 | |
| WO | 2006043170 A2 | 4/2006 | |
| WO | 2006112806 | 10/2006 | |
| WO | 2006124704 | 11/2006 | |
| WO | 2007110282 | 10/2007 | |
| WO | 2007147922 | 12/2007 | |
| WO | 2008025873 | 3/2008 | |
| WO | 2009146189 | 12/2009 | |
| WO | 2009153511 | 12/2009 | |
| WO | 2010070196 A1 | 6/2010 | |
| WO | 2010128210 | 11/2010 | |
| WO | 2010136641 | 12/2010 | |
| WO | 2011012131 | 2/2011 | |
| WO | 2011012133 A2 | 2/2011 | |
| WO | 2011012133 A3 | 2/2011 | |

OTHER PUBLICATIONS

WIPO, Patentscope, English Translation of the Written Opinion of the International Search Authority for PCT application PCT/DE2010/075071, corresponding to publication WO2011012133 to Sabinski, Feb. 3, 2012.

WIPO, Patentscope, documents tab for publication WO2011012133, printed Apr. 24, 2014 from http://patentscope.wipo.int/search/en/detail.jsf?docId=WO2011012133&recNum=1&tab=PCTDocuments& maxRec=1&office=&prevFilter=&sortOption=Pub+Date+Desc&queryString=FP%3A%28wo2011012133%29.

U.S. Appl. No. 13/419,898.

T. Kauko, European Patent Office, "Invitation to Pay Additional Fees and, Where Applicable. Protest Fee," International Searching Authority for corresponding International Application No. PCT/US2012/054183, European Patent Office, mailed Dec. 13, 2013.

Konrad Weeber, "Advanced Electric Machines Technology," Workshop on Future Large CO2 Compression Systems, Mar. 30-31, 2009.

James S. Smith and Andrew P. Watson, "Design, Manufacture, and Testing of a High Speed 10MW Permanent Magnet Motor and Discussion of Potential Applications," Proceedings of the Thirty-Fifth Turbomachinery Symposium, 2006, pp. 19-24.

Manoj R. Shah and Ayman M. El-Refaie, "Eddy Current Loss Minimization in Conducting Sleeves of High Speed Machine Rotors by Optimal Axial Segmentation and Copper Cladding," Conference Record of the 2007 IEEE Industry Applications Conference, 42nd IAS Annual Meeting, New Orleans, Louisiana, Sep. 23-27, 2007.

Daniel M. Saban, Cassandra Bailey, Klaus Brun and Delvis Gonzalez-Lopez, "Beyond IEEE Std 115 & API 546: Test Procedures for High-Speed, Multi-Megawatt Permanent-Magnet Synchronous Machines," Industry Applications Society 56th Annual Petroleum and Chemical Industry Conference, PCIC 2009, Sep. 14-16, 2009.

Cassandra Bailey, Daniel Saban and Paulo Guedes-Pinto, "Design of High-Speed Direct-Connected Permanent-Magnet Motors and Generators for the Petrochemical Industry," IEEE Transactions on Industry Applications, vol. 45, No. 3, pp. 1159-1165, May/Jun. 2009.

Vasileios Lelos, Steve Manifold and John Granier, "Structural Properties and Testing of a Composite Banding Used in High-Speed Rotors," IEEE Transactions on Magnetics, vol. 43, No. 1, pp. 250-253, Jan. 2007.

Andreas Binder, Tobias Schneider and Markus Klohr, "Fixation of Buried and Surface-Mounted Magnets in High-Speed Permanent-Magnet Synchronous Machines," IEEE Transactions on Industry Applications, vol. 42, No. 4, Jul./Aug. 2006, pp. 1031-1037.

(56) References Cited

OTHER PUBLICATIONS

Jason D. Ede, Z. Q. Zhu and David Howe, "Rotor Resonances of High-Speed Permanent-Magnet Brushless Machines," IEEE Transactions on Industry Applications, vol. 38, No. 6, Nov./Dec. 2002, pp. 1542-1548.

ESPACENET, Bibliographic data for DE102009026288A1 with abstract of corresponding document WO2011012133A2, printed Jan. 6, 2014.

* cited by examiner

ELECTRICAL MACHINES AND ELECTRICAL MACHINE ROTORS

CROSS REFERENCE TO RELATED APPLICATION(S)

This application claims the benefit of and priority to U.S. Provisional Patent Application Ser. No. 61/565,066, which was filed on Nov. 30, 2011 and is entitled "Electrical Machines and Electrical Machine Rotors." The complete disclosure of the above-identified patent application is hereby incorporated by reference for all purposes.

FIELD OF THE DISCLOSURE

The present disclosure relates to electrical machines, and more particularly to electrical machine rotors.

BACKGROUND

Examples of permanent magnet electrical machines and rotors therefor are disclosed in U.S. Pat. Nos. 6,452,301; 6,879,075; 6,967,420; and 7,619,342; in U.S. Patent Application Publication Nos. 2006/0255679 and 2008/0088193; in International Publication Nos. WO01/65663; WO2004/019467; WO2006/124704; WO2007/110282; WO2007/147922; and WO2011/012131; in European Patent Application Publication No. EP0955714; and in Japanese published patent application JP2006-158008A. Examples of electrical machine rotors with composite shafts are disclosed in U.S. Pat. Nos. 6,072,252 and 7,617,582. The disclosures of these and all other publications referenced herein are incorporated by reference in their entirety for all purposes.

SUMMARY

In some examples, electrical machine rotors may include a hollow nonmagnetic shaft, a pair of permanent magnets arranged to form a magnetic pole on the rotor, a pole iron, and a pair of opposed inter-pole irons. The pole iron may be disposed between the pair of permanent magnets, secured to the shaft, and may urge each of the pair of magnets against a corresponding one of the pair of opposed inter-pole irons.

In some examples, electrical machine rotors may include a fiber-reinforced composite shaft, a plurality of permanent magnet pairs disposed circumferentially around the shaft, a plurality of pole irons, and a plurality of opposed inter-pole iron pairs. Each pole iron may be disposed between first and second ones of one of the plurality of permanent magnet pairs and may retain the first and second ones of one of the permanent magnet pairs against respective first and second ones of one of the opposed inter-pole iron pairs.

In some examples, electrical machine rotors may include a hollow fiber-reinforced composite shaft, a pair of obliquely oriented permanent magnets arranged to form a magnetic pole on the rotor, and a pole iron disposed between the pair of magnets. The pole iron may radially retain the magnets relative to the shaft.

In some examples, electrical machine rotors may include a rotor body and at least one hollow fiber-reinforced composite shaft. The rotor body may extend along an axis to an end. The hollow composite shaft may be secured to the end of the rotor body and extend therefrom along the axis.

DETAILED DESCRIPTION

Figure 1:
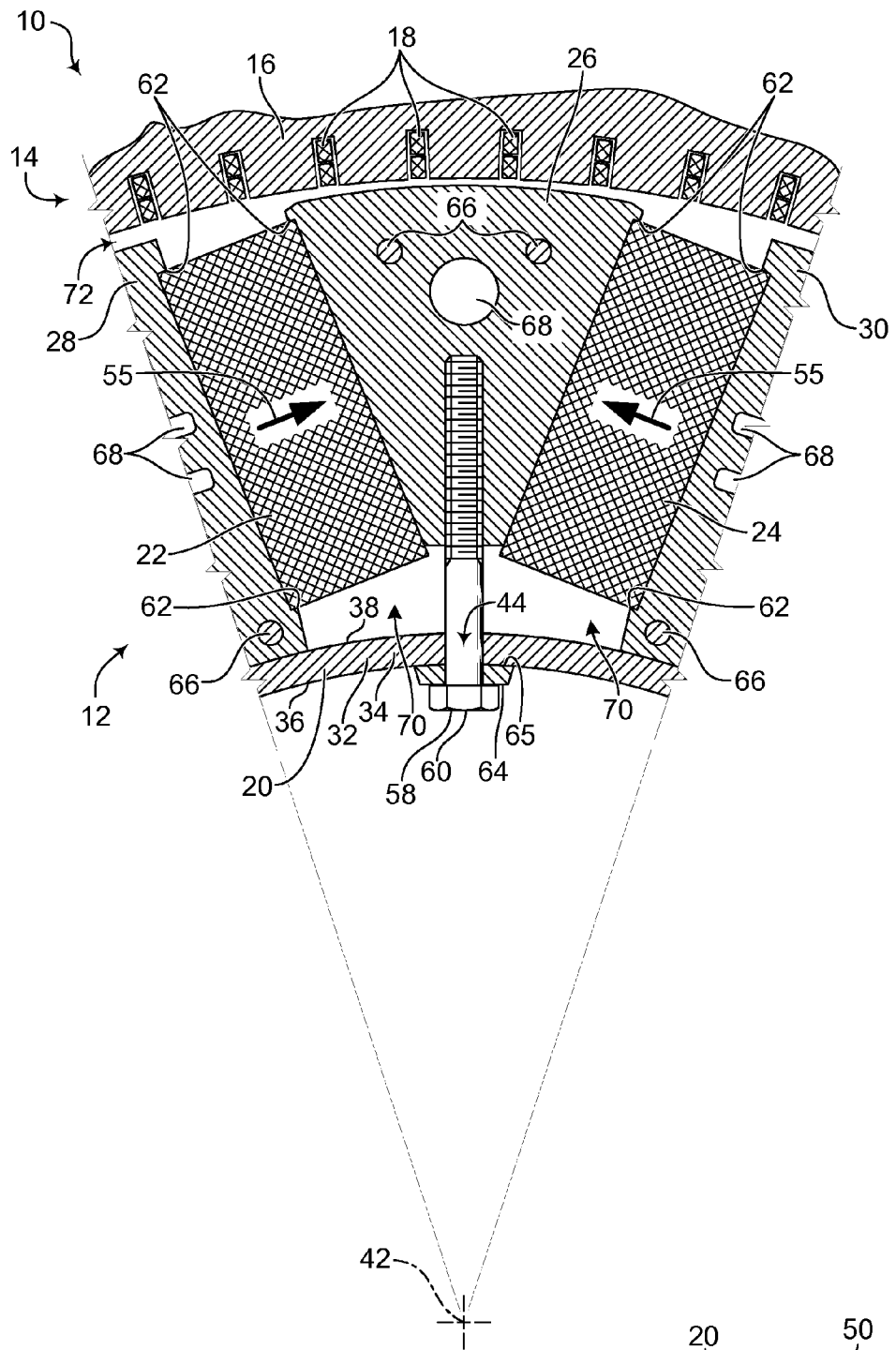
FIG. 1 is a cross-section partial view of a nonexclusive illustrative example of an electrical machine and its rotor.

A nonexclusive illustrative example of an electrical machine is shown generally at 10 in FIG. 1. Unless otherwise specified, the electrical machine 10 may, but is not required to, contain at least one of the structures, components, functionalities, and/or variations described, illustrated, and/or incorporated herein. In the illustrated example, the electrical machine 10 includes a nonexclusive illustrative example of an electrical machine rotor 12 and a stator 14. The stator 14 includes a stator iron 16 and at least one coil 18.

The electrical machine rotor 12 includes a shaft 20, at least one pair of permanent magnets 22, 24 arranged to form a magnetic pole on the rotor, at least one pole iron 26, and at least one pair of opposed inter-pole irons 28, 30. In some examples, the electrical machine rotor 12 may include a plurality of permanent magnet pairs disposed circumferentially around the shaft along with a plurality of pole irons and a plurality of opposed inter-pole iron pairs. As may be understood, the plurality of permanent magnet pairs disposed circumferentially around the shaft may form a plurality of magnetic pole pairs on the rotor.

As shown in FIG. 1, the shaft 20 may comprise a hollow body 32 having a wall 34 defined by an interior surface 36 and an exterior surface 38. In some examples, the shaft 20 may be nonmagnetic, fiber-reinforced, and/or fabricated at least partially from a suitable composite material. For example, the shaft may be a fiber-reinforced composite shaft that is fabricated at least partially from a fiber-reinforced composite material that includes a plurality of suitable reinforcing fibers embedded in a suitable matrix. In some examples, a fiber-reinforced composite shaft may have been fabricated substantially completely from a fiber-reinforced composite material that includes a suitable matrix material having suitable reinforcing fibers embedded therein. In some examples, a fiber-reinforced composite shaft may comprise a shaft fabricated from any suitable material, which may be nonmagnetic, with the shaft having been reinforced with one or more layers of suitable reinforcing fibers, which fibers may have been embedded in a suitable matrix material.

Nonexclusive illustrative examples of suitable fibers for the shaft 20 include carbon, aramid (such as Kevlar®), glass, polyester, polyethylene (such as Spectra®), quartz, boron, and aluminum fibers. A particular type of fiber, or combination of fiber types, may be selected such that the shaft 20 possesses or provides one or more desired material properties, such as high strength or high modulus, and/or a low coefficient of thermal expansion. In some examples, the shaft 20 may be fabricated using high modulus, or even ultrahigh modulus, carbon fibers, such as those having a modulus greater than about 350 GPa, greater than about 450 GPa or even greater than about 500 GPa.

Nonexclusive illustrative examples of suitable matrix materials for the fiber-reinforced composite of the shaft 20 include inorganic and organic polymers, including thermoplastic and thermosetting resins, such as epoxies and other cross-linking polymer resins. In some examples, one or more filler materials may be added to, or included in, the matrix material, such as to provide desired mechanical, thermal and/or electrical properties. For example, boron nitride or aluminum oxide particles may be added to, or included in, the matrix material In some examples, at least a portion of the shaft 20 may be fabricated by filament or tape winding a suitable filament or tape of fibers onto a suitable mandrel, which may be substantially cylindrical, to form the substantially cylindrical, hollow, fiber-reinforced composite body 32. The fibers of the filament or tape may be coated with resin during the winding process or the filament or tape may be in a "pre-preg" form, with fibers that are pre-impregnated with uncured or partially cured resin. In some examples, at least a portion of the shaft 20 may be fabricated by wrapping or laying-up sheets or plies of woven and/or unidirectional fibers, which may be in pre-preg form, onto the mandrel and/or onto previously filament or tape wound fibers. As may be understood, the interior surface 36 of the shaft body 32 may be formed by the exterior surface of the mandrel. The exterior surface 38 of the shaft body 32 may retain its as-wound or as-wrapped surface finish and/or it may be processed to provide a predetermined degree of smoothness and/or roundness. For example, the exterior surface 38 of the body 32 may be turned or machined after curing the matrix material to provide a predetermined degree of smoothness and/or roundness. In some examples, the exterior surface may be provided with a finish having a predetermined degree of smoothness and/or roundness during a curing process, such a through use of an wrap applied to the tube for and/or during a curing process.

As may be understood, the mechanical properties of the shaft 20, when fabricated at least partially from a fiber-reinforced composite material, may be selected, tuned or adjusted by using suitable combinations of fiber orientations. In particular, inclusion of fibers that are more closely parallel to an axis 42 of the shaft 20, or are substantially axially aligned, may provide or improve lateral stiffness or bending resistance, inclusion of fibers that are obliquely oriented or skew with respect to the axis of the shaft 20, or off-axis, may provide or improve torsional stiffness, while inclusion of fibers that are more closely circumferentially oriented or transverse to the axis of the shaft 20 may provide or improve the shaft's hoop strength or resistance to lateral compression or buckling. By way of a nonexclusive illustrative example, fibers may be considered to be: substantially axially aligned when the fibers are oriented at an angle of less than about plus or minus ten degrees) (±10°) relative to the axis of the shaft 20, obliquely oriented or skew when the fibers are oriented at an angle of between about plus or minus ten degrees (±10°) and about plus or minus eighty degrees (±80°) relative to the axis of the shaft 20, and circumferentially oriented or transverse when the fibers are oriented at an angle of between about plus or minus eighty degrees (±80°) and about ninety degrees (90°) relative to the axis of the shaft 20. In some nonexclusive illustrative examples, the shaft 20 may include a suitable combination of: fibers that are substantially axially-aligned or at approximately zero degrees (0°) relative to the axis of the shaft, fibers that are oriented or wrapped at an angle of about plus or minus forty-five degrees (±45°) relative to the axis of the shaft, and/or fibers that are oriented or wrapped at an angle of about ninety degrees (90°) relative to the axis of the shaft.

As compared to a forged and/or machined metal shaft, a shaft that is at least partially formed from a fiber-reinforced composite material may have a reduced weight, an increased diameter, and/or a similar or even increased or reduced stiffness. In particular, fabricating a hollow shaft from a fiber-reinforced composite material may allow for a shaft with an increased diameter, which may result in a shaft of similar or even reduced weight, but with comparable or greater, or even much greater, stiffness and/or strength, as compared to a metal shaft. As may be understood, reducing shaft weight or mass, along with the attendant reduction in rotor weight or mass, may allow reductions in bearing size, weight, loading and/or losses, which may result in improved bearing lifespan.

In some examples, the shaft 20 may support or improve heat transfer within the rotor 10, such as by supporting or improving the transfer and dissipation of heat away from the active portions of the rotor. For example, the relatively large surface area to volume ratio of the hollow shaft 20 may permit improved or efficient heat dissipation to the atmosphere from the shaft 20. In addition, fabricating the shaft 20 at least partially from a fiber-reinforced composite material comprising fibers having a relatively high heat conductivity, such as carbon fibers, with at least some of the fibers being at least partially axially aligned, may permit improved or efficient conduction of heat away from the active portions of the rotor through the shaft. Such improved or efficient conduction and dissipation of heat through a relatively large diameter fiber-reinforced composite shaft may allow or support reduction of rotor temperature and/or reduction of rotor thermal expansion. In addition, the relatively low, or even zero, coefficient of thermal expansion that may be achieved with some non-exclusive illustrative example carbon fiber-reinforced composites may reduce the axial and/or radial shaft growth that may otherwise occur with rising temperatures.

As may be understood, electrical machine rotor shafts having an increased diameter may allow for an increased air gap radius or diameter, which may result in increased electrical machine performance in the form of higher torque, higher speed, lower frequency, higher power, higher power at a given torque, and/or axial machine length reduction for a given electrical machine torque and/or power rating. Furthermore, when used with a magnetic shaft bearing, the larger diameter shafts that may be realized with an at least partially fiber-reinforced composite shaft may permit use of axially shorter and/or more compact magnetic shaft bearings.

Figure 2:
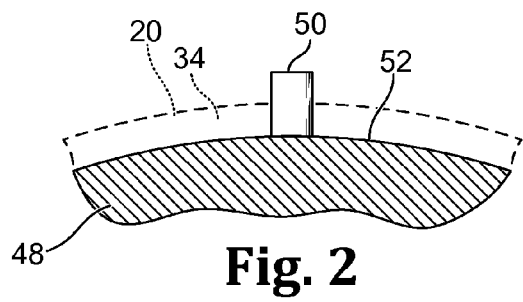
FIG. 2 is a cross-section partial view of a nonexclusive illustrative example of a mandrel suitable for filament or tape winding at least a portion of a fiber-reinforced composite shaft for an electrical machine rotor, such as for the electrical machine of FIG. 1.

The shaft 20 may include at least one hole 44 extending through the wall 34 of the shaft, from the interior surface 36 to the exterior surface 38. The holes 44 may be formed or fabricated using any suitable method, including drilling through the walls of a cured fiber-reinforced composite shaft. In some examples, the holes 44 may be at least partially formed or fabricated during the filament or tape winding process. For example, the shaft 20 may be filament or tape wound onto a mandrel, such as the mandrel 48 shown in FIG. 2, which includes at least one pin 50 that extends from its exterior surface 52 to form a hole through the wall 34 of the shaft, with the exterior surface 52 of the mandrel 48 forming the interior surface of the shaft wall.

The permanent magnets 22, 24 may be of any suitable configuration and may be fabricated from any suitable material. For example, as shown in FIG. 1, each of permanent magnets 22, 24 may have a substantially rectangular cross-section and may be obliquely oriented with respect to the exterior surface 38 or circumference of the shaft 20 so that the pair of magnets 22, 24 together form a magnetic pole on the rotor 12. The poles of each of the magnets 22, 24 may be arranged as suggested by the arrows 55.

As shown in FIG. 1, the pole iron 26 is disposed between the first and second ones of the pair of magnets 22, 24 and secured to the shaft 20 by way of a suitable fastener 58, such as the bolt 60, with the pole iron 26 radially retaining the magnets 22, 24 relative to the shaft 20. In particular, the fastener 58 extends through the hole 44 and bears against the interior surface 36 of the shaft 20 and urges the pole iron 26 towards the exterior surface 38 of the shaft. The pole iron 26 urges each of the first and second ones of the pair of magnets 22, 24 against a corresponding one of the pair of opposed inter-pole irons 28, 30 so as to retain the first and second ones of the pair of magnets 22, 24 against the corresponding ones of the inter-pole irons 28, 30. The first and second ones of the pair of magnets 22, 24 urge the corresponding ones of the inter-pole irons 28, 30 against the exterior surface 38 of the shaft 20 so as to retain the corresponding inter-pole irons 28, 30 against the shaft 20. In some examples, the pole iron 26 and/or the inter-pole irons 28, 30 may include one or more features 62, such as a projection, edge, ledge or lip, which may engage and/or assist with retaining one of the magnets 22, 24.

As shown in FIG. 1, the rotor 12 may include a bearing member 64, such as a washer, such that the fastener 58 bears against the bearing member 64, which is urged against the interior surface 36 of the shaft 20. The bearing member may distribute the contact stresses from the fastener over a greater portion of the interior surface of the shaft. The bearing member 64 may be provided with an outer surface 65 that is configured to engage and/or conform to the interior surface 36 of the shaft 20, For example, as shown in FIG. 1, the outer surface 65 may be rounded or radiused so as to mate with the interior surface of the shaft. In some examples, the interior surface 36 of the shaft 20 may be configured to engage or receive the bearing member 64. For example, the interior surface 36 of the shaft 20 may include at least one faceted and/or generally planar region, such as within at least the active portion of the rotor, that is configured to receive at least one bearing member 64. Such a faceted and/or generally planar region on the interior surface 36 of the shaft 20 may, in some examples, be fabricated and/or formed during the filament or tape winding process by way of corresponding facets and/or generally planar regions on the exterior surface of the mandrel.

In some examples, the rotor 12 may include a plurality of fasteners 58 arranged in an axially extending row and extending through a plurality of holes 44 through the wall 34 of the shaft 20 and into the pole iron 26. In such examples, the rotor 12 may include a plurality of bearing members 64, each associated with at least one of the fasteners 58, or the rotor 12 may include an axially extending bearing member 64 through which some, or even all, of the fasteners 58 in a particular axially extending row extend. In some examples, a particular bearing member may be associated with the fasteners associated with two or more of the pole irons, such as where the bearing member extends at least partially around the circumference of the interior surface of the shaft.

The pole iron 26 and the inter-pole irons 28, 30 may be of any suitable construction. For example, the pole iron and/or the inter-pole irons may be fabricated or laminated from a stack of laser- or otherwise-cut iron laminations, each of which may have a thickness that is between about one half and about five millimeters (0.5-5 mm). In some examples, at least some of the iron laminations may have a thickness that is less than about one half millimeter (0.5 mm) or greater than about five millimeters (5 mm).

In some examples, the pole iron 26 and/or the inter-pole irons 28, 30 may include one or more axially extending stiffeners or reinforcing members 66. In such examples, the reinforcing members 66 may be pre- or post-stressed to be under tension and welded, or otherwise fastened, to the end ones of the laminations such that the reinforcing members 66 maintain the iron laminations under a state of axial compression.

In some examples, the pole iron 26 and/or the inter-pole irons 28, 30 may include one or more axially extending vents or channels 68, which may permit or enhance coolant or air circulation through and/or around the rotor 12 and the electrical machine 10. In some examples, the shaft 20 may include one or more generally radially oriented ventilations features, passages or openings, which may extend through the wall 34 of the shaft.

The regions 70 between the magnets 22, 24 and the shaft 20 may be open, as shown in FIG. 1, or these regions may be filled with a suitable structure, which may include at least one axially extending channel or vent passage.

In some examples, the rotor 12 may include a sleeve extending around its circumference, proximate the air gap 72.

As may be understood, using a non-magnetic material, such as a fiber-reinforced composite, for the shaft 20 may reduce magnetic flux leakage through the shaft. Furthermore, use of a non-magnetic shaft material may eliminate the need to use a non-magnetic material, such as stainless steel, for the fasteners 58, which may allow use of higher strength fasteners, including those fabricated from magnetic or ferromagnetic materials.

As may be understood, the combination of a relatively large diameter hollow shaft 20 fabricated from a non-magnetic material, such as a fiber-reinforced composite, along with the higher strength fasteners 58 that may be used if the fasteners don't need to be non-magnetic, may allow or support electrical machine designs having a larger air-gap diameter and/or that are capable of higher speed operation. For example, the electrical machine 10 may be sized such that, and/or operate at speeds at which, the rotor 12 experiences centrifugal forces per axial unit length in excess of about 200 N/mm, or even in excess of about 500 N/mm, such as about 800 or more N/mm.

Figure 3:
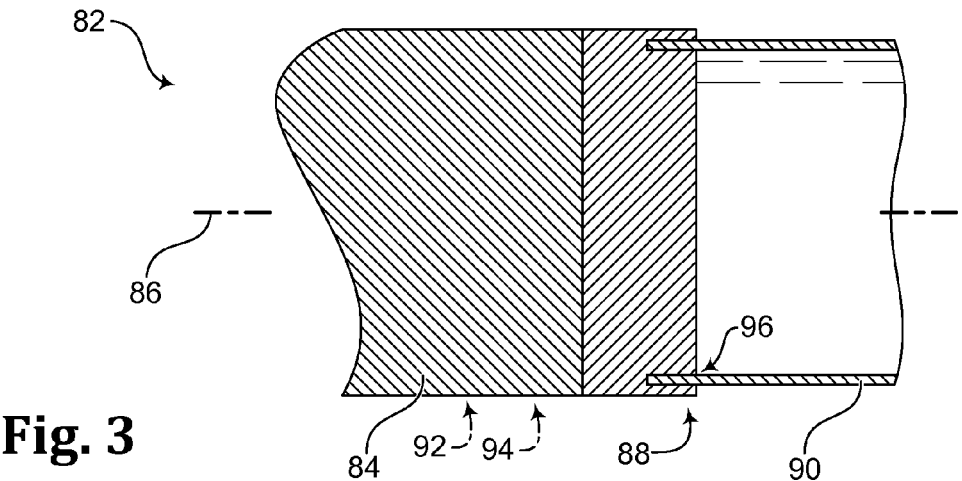
FIG. 3 is a longitudinal axial section view of another nonexclusive illustrative example of an electrical machine rotor.
Figure 4:
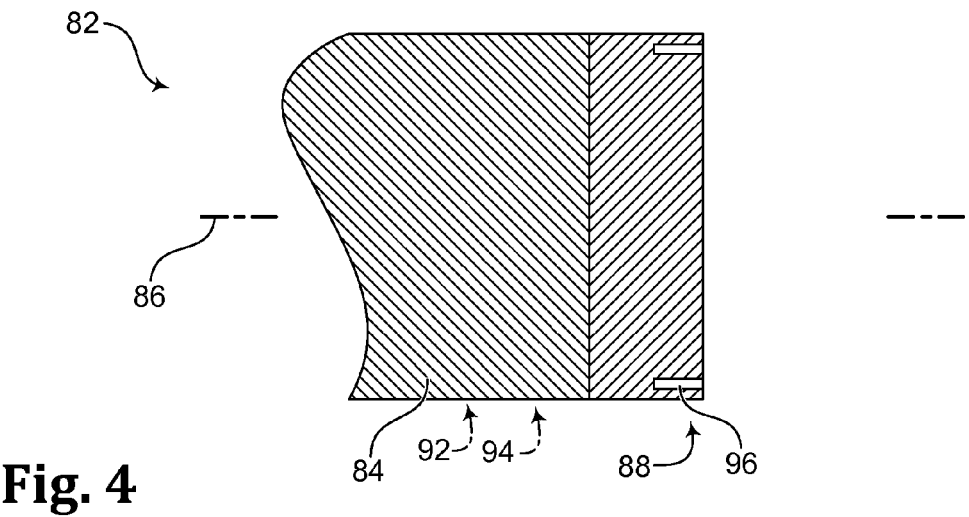
FIG. 4 is a longitudinal axial section view of the electrical machine rotor of FIG. 3, shown with the shaft omitted.

Another nonexclusive illustrative example of an electrical machine rotor, which may be suitable for use in an electrical machine, such as the electrical machine 10, is shown generally at 82 in FIGS. 3 and 4. Unless otherwise specified, the electrical machine rotor 82 may, but is not required to, contain at least one of the structures, components, functionalities, and/or variations described, illustrated, and/or incorporated herein. In the illustrated example, the electrical machine rotor 82 includes a rotor body 84 extending along an axis 86 to an end 88, with at least one hollow shaft 90 extending from the end 88 of the rotor body 84 along the axis 86. In some examples, the rotor body 84 may be at least partially hollow and/or have an opening extending therethrough. In some examples, the rotor body 84 may include at least one permanent magnet 92. In some examples, such as where the rotor 82 is incorporated into a wound-field synchronous machine, the rotor body 84 may include a field winding 94.

The shaft 90 may comprise or be fabricated from a fiber-reinforced composite material, as discussed herein, and may be secured to the end 88 of the rotor body 84 such as by way of adhesive bonding. For example, as shown in FIGS. 3 and 4, the end 88 of the rotor body 84 may include at least one annular opening 96 that is coaxially arranged with the axis 86, with the end of the shaft 90 being adhesively bonded or otherwise secured into the corresponding annular opening 96.

In some examples, the rotor body 84 may extend along the axis 86 from the end 88 to a second end opposite the end 88. In such an example, at least one hollow shaft may extend from the second end of the rotor body 84 along the axis 86.

In some examples, the end of the shaft 90 and/or the annular opening 96 may be correspondingly configured to enhance the mechanical properties of the joint between the shaft 90 and the end 88. For example, the end of the shaft 90 and the annular opening 96 may include one or more mechanically interlocking or keying elements, such as one or more castellations, which may assist or even improve torque transfer between the shaft 90 and the end 88 of the rotor body 84.

In some examples, the rotor 82 may be configured for use in an induction electrical machine. For example, the rotor 82 may be configured as a squirrel cage rotor, a slip ring rotor or a solid core rotor.

Figure 5:
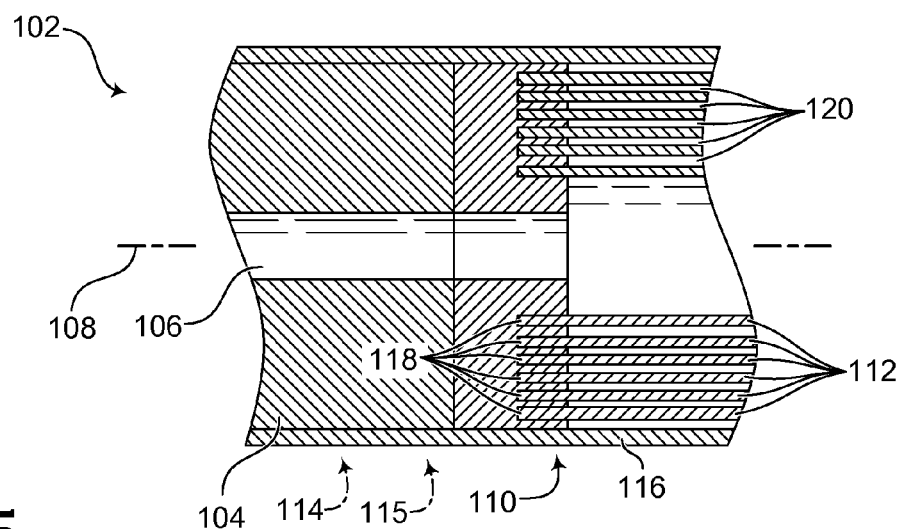
FIG. 5 is a longitudinal axial section view of another nonexclusive illustrative example of an electrical machine rotor.

Another nonexclusive illustrative example of an electrical machine rotor, which may be suitable for use in an electrical machine, such as the electrical machine 10, is shown generally at 102 in FIG. 5. Unless otherwise specified, the electrical machine rotor 102 may, but is not required to, contain at least one of the structures, components, functionalities, and/or variations described, illustrated, and/or incorporated herein. In the illustrated example, the electrical machine rotor 102 includes a rotor body 104 that has a central opening 106 and extends along an axis 108 to an end 110. A plurality of coaxially arranged hollow shafts 112 extend from the end 110 of the rotor body 104 along the axis 108. In some examples, the rotor body 104 may include at least one permanent magnet 114. In some examples, such as where the rotor 102 is incorporated into a wound-field synchronous machine, the rotor body 104 may include a field winding 115. In some examples, the rotor 102 may include a sleeve 116.

As shown in FIG. 5, the end 110 of the rotor body 104 includes a plurality of coaxially arranged annular openings 118 into which the ends of the plurality of coaxially arranged hollow shafts 112 may be secured, such as by way of adhesive bonding. In some examples, the hollow shafts 112 may vary in wall thickness and/or fiber orientation, and/or the gaps 120 between adjacent ones of the hollow shafts 112 may vary.

In some examples, the rotor body 104 may extend along the axis 108 from the end 110 to a second end. In such an example, a plurality of coaxially arranged hollow shafts may extend from the second end of the rotor body 104 along the axis 108.

The presence of the gaps 120 between adjacent ones of the hollow shafts 112 may permit air or cooling flow between the adjacent ones of the hollow shafts 112. In some examples, one or more of the shafts 112 may include at least one opening or hole extending through the wall thereof such that air or cooling flow may be directed into the active portion of the rotor body 104, which may support cooling of the rotor and/or any of its various components.

In some examples, the rotor 102 may be configured for use in an induction electrical machine. For example, the rotor 102 may be configured as a squirrel cage rotor, a slip ring rotor, or a solid core rotor.

As used herein the term "configured" should be interpreted to mean that the identified elements, components, or other subject matter are selected, created, implemented, utilized, designed, modified, adjusted and/or intended to perform the indicated action and/or to perform, operate, behave and/or react in the indicated manner.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a" or "a first" element, or the equivalent thereof, should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. An electrical machine rotor, comprising:
   a hollow nonmagnetic shaft;
   a pair of permanent magnets arranged to form a magnetic pole on the rotor;
   at least one fastener;
   a pole iron disposed between the pair of permanent magnets and secured to the shaft; and
   a pair of opposed inter-pole irons, wherein the pole iron urges each of the pair of permanent magnets against a corresponding one of the pair of opposed inter-pole irons,
   wherein the shaft includes interior and exterior surfaces, and the at least one fastener bears against the interior surface of the shaft and urges the pole iron towards the exterior surface of the shaft with the pole iron radially retaining the pair of permanent magnets relative to the shaft,
   wherein the pair of permanent magnets urge the corresponding ones of the inter-pole irons against the exterior surface of the shaft so as to retain the corresponding inter-pole irons against the shaft.

2. The rotor of claim 1, wherein the shaft is fabricated at least partially from a fiber-reinforced composite material.

3. The rotor of claim 2, wherein at least a portion of the shaft is filament or tape wound onto a substantially cylindrical mandrel.

4. The rotor of claim 3, wherein the shaft includes interior and exterior surfaces and a hole extending from the interior surface to the exterior surface, wherein the hole is fabricated by a pin extending from the mandrel when the portion of the shaft is filament or tape wound onto the mandrel.

5. The rotor of claim 1, wherein the pole iron and inter-pole irons comprise axially laminated layers.

6. The rotor of claim 5, comprising at least one axially extending member supporting the axially laminated layers.

7. The rotor of claim 1, wherein each of the permanent magnets has a substantially rectangular cross-section and is obliquely oriented with respect to an exterior surface of the shaft.

8. The rotor of claim 1 assembled into an electrical machine, the electrical machine comprising:
   the rotor; and
   a stator including a stator iron and at least one coil.

9. An electrical machine rotor, comprising:
   a fiber-reinforced composite shaft;
   a plurality of permanent magnet pairs disposed circumferentially around the shaft;
   a plurality of fasteners;
   a plurality of pole irons, each pole iron being disposed between first and second ones of one of the plurality of permanent magnet pairs; and a plurality of opposed inter-pole iron pairs,
wherein each pole iron retains the first and second ones of one of the permanent magnet pairs against respective first and second ones of one of the opposed inter-pole iron pairs,
wherein the shaft includes interior and exterior surfaces, and each fastener bears against the interior surface of the shaft and urges one of the pole irons towards the exterior surface of the shaft with that pole iron radially retaining the corresponding permanent magnet pair relative to the shaft,
wherein each of the permanent magnet pairs urges the corresponding opposed inter-pole iron pair against the exterior surface of the shaft so as to retain that opposed inter-pole iron pair against the shaft.

10. The rotor of claim 9, wherein at least some of the pole irons and inter-pole irons are of laminated construction.

11. The rotor of claim 9, wherein the shaft comprises a substantially cylindrical hollow body.

12. The rotor of claim 9, wherein the shaft is fabricated at least partially by way of a filament or tape winding process, each fastener extends through the substantially cylindrical hollow body through a hole extending from the interior surface to the exterior surface, and each hole is fabricated by a pin extending from a mandrel during the filament or tape winding process.

13. The rotor of claim 9, wherein at least one of the first and second ones of at least some of the plurality of permanent magnet pairs is obliquely oriented with respect to a circumference of the shaft.

14. The rotor of claim 9 assembled into an electrical machine, the electrical machine comprising:
the rotor; and
a stator including a stator iron and at least one coil.

15. The rotor of claim 9, comprising at least one bearing member, wherein at least one of the fasteners bears against the interior surface of the shaft by way of the at least one bearing member with the at least one fastener bearing against the at least one bearing member to urge the at least one bearing member against the interior surface of the shaft.

16. The rotor of claim 1, wherein the shaft comprises fibers selected from the group consisting of: fibers which are substantially axially aligned to an axis of the shaft; fibers which are obliquely oriented to an axis of the shaft; and fibers which are circumferentially oriented to an axis of the shaft.

17. The electrical machine rotor of claim 9, wherein the shaft comprises fibers selected from the group consisting of: fibers which are substantially axially aligned to an axis of the shaft; fibers which are obliquely oriented to an axis of the shaft; and fibers which are circumferentially oriented to an axis of the shaft.

* * * * *